United States Patent [19]

Schulze

[11] 4,119,615
[45] Oct. 10, 1978

[54] THERMOPLASTIC ADHESIVE POLYOXAMIDE FROM POLYOXYPROPYLENE POLYAMINE

[75] Inventor: Heinz Schulze, Austin, Tex.

[73] Assignee: Texaco Development Corporation, New York, N.Y.

[21] Appl. No.: 726,400

[22] Filed: Sep. 24, 1976

[51] Int. Cl.$^2$ .............................................. C08G 69/26
[52] U.S. Cl. .................... 528/343; 260/561 R; 260/830 P; 428/474; 528/342
[58] Field of Search ........................ 260/78 R, 78 TF

[56] References Cited

U.S. PATENT DOCUMENTS 3,882,090   5/1975   Fagerburg et al. ............... 260/78 R

*Primary Examiner*—Harold D. Anderson
*Attorney, Agent, or Firm*—Thomas H. Whaley; Carl G. Ries; James L. Bailey

[57] ABSTRACT

Covers a novel thermoplastic adhesive composition comprising a polyoxamide formed by reacting a polyoxypropylene polyamine selected from the group consisting of diamines, triamines and mixtures thereof, and having an average molecular weight of about 190 to about 3,000 with oxalic acid to form a liquid prepolymer, said prepolymer being further reacted with a diamine having the formula:

$$NH_2 - R - NH_2$$

where R is a divalent hydrocarbon radical containing 2-18 carbon atoms to form said resinous polyoxamide.

Also covers a method of preparing said thermoplastic adhesive compound by reacting oxalic acid with a polyoxypropylene polyamine to form a prepolymer and thereafter reacting said prepolymer with a diamine such as an alkylene diamine to form said adhesive. Other components, e.g., a minor amount of polyepoxide resin having an epoxide equivalent weight of about 150 to about 600, a compatible plasticizing agent, filler and the like may be added to the polyoxamide to provide a formulated thermoplastic adhesive composition having a broad range of hardness, flexibility and compatibility, capable of bonding together a variety of substrates.

19 Claims, No Drawings

THERMOPLASTIC ADHESIVE POLYOXAMIDE FROM POLYOXYPROPYLENE POLYAMINE

BACKGROUND OF THE INVENTION

This invention relates to a thermoplastic adhesive and more particularly pertains to a novel thermoplastic adhesive comprising a polyoxamide prepared by reacting in a specific reaction scheme oxalic acid, a polyoxypropylene polyamine, and a diamine.

Description of the Prior Art

The utilization of polyamide reaction products of certain aliphatic polyamines and vegetable or animal-based dimer or trimer fatty acids as thermoplastic or hot-melt adhesives for the bonding of a multitude of materials, such as leather, textiles, wood, and the like, is well-known as shown by U.S. Pat. No. 2,969,555 to Kamborian. Generally, such thermoplastic adhesives are prepared by the condensation reaction of aliphatic polyamines, e.g. polyethylene polyamines such as ethylenediamine, diethylenetriamine, hexamethylenediamine, and other related aliphatic polyamines, and a polymerized polyene fatty acid, ester or anhydride prepared by the thermal polymerization of fatty oils containing glycerides of polymerizable fatty acids such as soybean oil, linseed oil, cottonseed oil, castor oil, and the like. The polyamide reaction products are prepared by heating such admixtures at temperatures which readily produce polyaminolysis of the fatty esters or dehydration of the polyamine salts of the fatty acids, as described in U.S. Pat. No. 2,450,940 to Cowan et al.

U.S. Pat. No. 2,867,592 to Morris, et al. describes an improved thermoplastic adhesive for use in rod form which contains an admixture of a polyamide reaction product of an alkylene polyamine and a polymerized fatty acid, ester or anhydride and a minor amount of a resinous polyepoxide. Patentees disclose that the addition of the resinous polyepoxide increases the dimensional stability and strength of the thermoplastic adhesive during preparation and use.

However, vegetable or animal-base dimer and trimer fatty acid materials usually employed in the preparation of polyamide-based thermoplastic adhesives are in increasing short supply and are continuously increasing in price. Moreover, the aliphatic polyamine compounds mentioned hereinabove are also used in great quantities as curing agents for polyepoxide resins, thus making them more unobtainable.

One proposed source of an adhesive compound is a polyamide prepared from oxalic acid. However, it has been found that normally one cannot make a useful polyoxamide adhesive in that due to relatively high reactivity of the oxalic acid in other proposed polyamines, the prepared polyoxamide is not meltable so as to be useful as a hot melt adhesive or other type adhesive composition. Attempts to prepare a modified polyoxamide of this type useful as an adhesive have usually been unsuccessful or failed due to high costs, unavailability of raw material, processing difficulties, etc.

Driven by the need for satisfactory replacement for the above discussed naturally derived materials, I have now discovered a novel thermoplastic adhesive formulation which can be prepared from synthetic materials that are more economical and readily available than those heretofore employed and mentioned hereinbefore. Moreover, surprisingly, the thermoplastic adhesive compounds of the present invention based on oxalic acid as one reactant exhibit broad ranges of hardness, flexibility and compatibility, as well as a broad range of melt temperatures and are capable of bonding together a wide variety of materials. These novel adhesives are capable of being combined with other components, e.g. polyepoxide resins, plasticizers, filler, etc., to provide tailored adhesive systems having specifically desired properties.

SUMMARY OF THE INVENTION

Accordingly, the present invention comprises a novel thermoplastic adhesive composition comprising a resinous polyoxamide formed by reacting a polyoxypropylene polyamine selected from the group consisting of diamines, triamines and mixtures thereof, and having an average molecular weight of about 190 to about 3,000 with oxalic acid to form a liquid prepolymer, said prepolymer being further reacted with a diamine having the formula:

where R is a divalent hydrocarbon radical containing 2–18 carbon atoms to form said resinous polyoxamide. These polyoxamide adhesive compounds usually have a melting point less than 250° C. and are prepared by mixing and reacting the aforementioned polyoxyalkylene polyamine and oxalic acid to form a prepolymer followed by reaction of the prepolymer with the above described diamine compound to prepare a useful polyoxamide adhesive.

DETAILED DESCRIPTION OF THE INVENTION

Polyoxypropylene polyamines, and procedures for their preparation, useful in producing the thermoplastic adhesives of the invention are well-known and amply described in the literature. See, for example, U.S. Pat. No. 3,654,370.

Polyoxypropylene polyamines are known to be particularly useful as curing agents for polyepoxide resins as illustrated in U.S. Pat. No. 3,462,393. Surprisingly, we have now discovered that these polyamine materials, when used in the preparation of the polyamide reaction product of the present invention, produce new and unexpected hot-melt adhesives.

Preferably, we employ polyoxypropylene diamines of the formula:

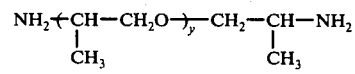

wherein $y$ is an number of from about 2 to 40, and polyoxypropylene triamines of the formula:

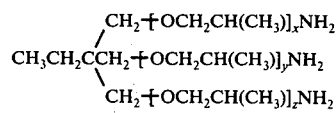

where $x$, $y$ and $z$ represents numbers in the range of about 1 to 15, and the sum of $x$, $y$ and $z$ is from 3 to about 40. The preferred polyoxypropylene diamines of the formula have average molecular weights between about 190, where $y$ is an average of 2.0 to about 2,000 where $y$ is an average of about 33.2. Preferred polyoxypropylene triamines of the above formula have average molecular weights between about 200 to about 3,000. These polyoxypropylene di- and triamines are readily available commercially in a wide variety of molecular weight ranges, such as those sold by Jefferson Chemical Company, Inc., Houston, Texas, under the trademark JEFFAMINE ®.

The above described polyoxyalkylene polyamines are then reacted with oxalic acid to first produce a liquid prepolymer. More particularly, the prepolymer product of the present invention is prepared by mixing and reacting oxalic acid at a temperature of between about 75° C. to about 250° C. The polyoxypropylene polyamine and oxalic acid compounds are preferably mixed and reacted in a ratio of 1–4 moles of oxalic acid per mole of polyamine. More preferably the mole ratio is 1–2:1 and more preferably the reaction is run at 2 moles of oxalic acid per mole of polyamine. The admixture is usually heated for several hours, i.e., form about 1 to about 12 hours, to complete the reaction while by-product is removed. It is understood, of course, that an ester of oxalic acid may also be employed as a reactant such as a lower monoalkyl or dialkylester including, for example, the methyl, ethyl, propyl, butyl, etc. full or half esters of oxalic acid. Thus, by the term "oxalic acid" when used as a reactant is also meant to encompass esters thereof, and particularly lower alkyl (1–4 carbon atoms) mono or diesters. After removal of water or alcohol, depending upon the oxalic reactant employed, preferably the reaction mixture is vacuum stripped to develop optimum molecular weight.

The second step of the process involves reaction of the above described prepolymer with a diamine having the structure:

$NH_2 - R - NH_2$ wherein R is a divalent hydrocarbon radical containing 2–18 carbon atoms. Typical diamines include ethylenediamine, tetramethylenediamine, pentamethylenediamine, hexamethylenediamine, octamethylenediamine, decamethylenediamine, para-xylylenediamine, 3-methylhexamethylenediamine, cyclohexyldiamine, phenylenediamine, etc. Though not a preferred embodiment, the diamine reactants may also contain additional amino groups other than the two primary amino groups. Thus, such polyamines as diethylenetriamine, triethylenetetramine and the like may be used here. The prepolymer is reacted with the diamine in an amount of 0.5–1.5 moles of diamine per mole of prepolymer at a temperature of 100°–250° C. More often 0.5–1 moles of diamine are reacted per mole of prepolymer.

It is important that the sequence of reactions be followed as just described, namely, first the preparation of a prepolymer followed by further reaction with a diamine to produce the final polyoxamide. If one attempts to react all three components at once, a product is prepared which cannot be used as a useful adhesive in that it has an extremely high molecular weight, and cannot be melted or worked with in any practical manner. By first preparing a prepolymer, the polyoxypropylene polyamine of lower reactivity compared to the diamines described here are allowed to react with the oxalic acid leaving final reaction of the thus prepared polyamide to occur with the faster reacting diamine.

In contra distinction to prior art oxamides usually prepared which have extremely high melting points or are even non-meltable prior to their decomposition point and/or are extremely brittle, the oxamides here have sufficient flexibility, excellent hardness, and yet are not unduly brittle. Thus, molded articles can be produced which are sufficiently hard to resist undue scratching. If the polyoxamide polymer were unduly brittle, even while good bonding could be achieved when used as an adhesive, nevertheless by putting stresses upon the bond, it would tend to fracture or break.

The final polymer then is a hard thermoplastic resin which is non-tacky, easily meltable, and could be sold in blocks or chips, can be subsequently melted, poured in molds and molded plastic articles prepared therefrom. Likewise, the final thermoplastic resins can be used to bond metals, glass, cloth, etc., and are extremely useful as hot melt adhesives.

The resinous polyamides which have a broad range of hardness and flexibility also have compatibility with a variety of other components such as plasticizers and the like. The products here have comparable physical and adhesive and bonding properties as compared to conventional thermoplastic adhesives prepared from the polyamide reaction products of polyamides such as ethyleneamines and vegetable or animal-based dimer or trimer fatty acids. The present invention thus eliminates the need for employing vegetable or animal-based dimer or trimer fatty acids for the preparation of thermoplastic adhesives which are usually in short supply in the marketplace and continuously increasing in price.

As just mentioned, the thermoplastic adhesive compounds in the invention are compatible with plasticizers, fillers and the like whereby thermoplastic adhesive compositions of specifically desired physical characteristics can be produced which are capable of bonding a variety of substrates. In addition, the thermoplastic adhesive compounds here can be mixed with a variety of cross-linking agents such as polyepoxides, e.g., polyglycidyl ethers of polyhydric phenols having an epoxide equivalent weight of about 150 to about 600.

Preferred thermoplastic adhesive compounds comprise a resinous polyoxamide characterized by the following structural formula:

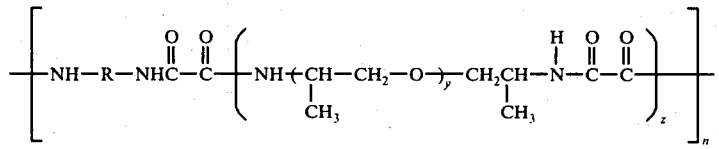

where R is a divalent hydrocarbon radical containing 2–18 carbon atoms, y is a number ranging from about 2 to about 40, and more preferably is 2–20, z is a number ranging from about 1 to 10 and n is a number ranging from about 2 to about 20. The above adhesive compounds are further characterized as having a melting point less than about 250° C., and more often having a melting point of from about 80 to about 250° C. Normally, the molecular weight of the final products will be less than about 30,000, and usually range from about 10,000 to about 20,000. However, in some instances the molecular weight may range as high as 100,000–200,000.

As noted above, the adhesives here may be easily uniformly mixed with other usual adhesive components to form a total formulation of exceptional quality and utility. Thus, a polyepoxide resin cross-linking agent may be admixed with the resulting resinous polyamine reaction product of the invention in an amount of about 1 to about 25 weight percent, based upon the total formulation weight, at a temperature above the melting points of each component. Polyepoxide resin components used are well-known in preparing thermoplastic adhesives. Such polyepoxides are complex resinous materials and are generally prepared by the reaction of polyhydric organic compounds with a chlorohydrin. References which describe in detail methods of preparing the epoxide resins of the type concerned here include "Epoxy Resins", by Lee and Neville, McGraw-Hill Book Company, Inc. (1957), and "Epoxy Resins", by Irving Skeist, Reinhold Publishing Company (1958). The preferred polyepoxide resins are the polyglycidyl ethers of polyhydric phenols, such as the diglycidyl ether of resorcinol, the triglycidyl ether of phloroglucinol, the tetraglycidyl ether of tetraphenylolethane or the polyglycidyl ether of a phenolformaldehyde novolac. Especially preferred is the diglycidyl ether of 4,4'-isopropylidenediphenol, generally known as bis-phenol A, containing a minor amount of cogeneric materials of higher molecular weight and having an epoxide equivalent weight (grams of resin containing one equivalent epoxide) of approximately 150 to about 600.

The polyamide reaction product composition of the invention will normally contain several unreacted amine and carboxyl groups. It is believed that these unreacted groups react with the epoxy group of the subsequently added polyepoxide resin and enhances the desired physical thermoplastic properties. Thus, preferably, the polyamide reaction product component will contain a total amine content of about 0.1 to about 2.0 meq./g. and will have an acid number of between about 2 to about 20. The total amine content and acid number can be readily determined by well-known analytical procedures.

Preferably, the polyepoxide resin component is added to the polyamide reaction product composition in an amount of from about 5 to about 25 weight percent based upon the total weight of the formulation. The specific amount employed is dependent upon the epoxide equivalent weight of the polyepoxide resin, the total amine content and acid number of the polyamide reaction product and should be an amount which will not produce gelation. The specific amount for given components can be readily determined by one having ordinary skill in the art with only minor experimentation, such as that described in U.S. Pat. No. 2,867,592 to Morris et al., Jan 6, 1959, which is incorporated herein be reference. The experimentation describes heating components containing varying amounts of polyepoxide resin to 150° C. in 1-inch glass tubes and dropping a 3/16 inch steel ball therein. Gelation is defined therein as the state whereby the steel ball will fall or will not fall regularly through the resinous components.

In an especially preferred embodiment of the invention, a diglycidyl ether of bis-phenol A having an epoxide equivalent weight of about 175 to 190 is added to the above-described polyamide reaction product in an amount of about 5 to about 25 weight percent, based upon total formulation weight while the resinous polyamide component is heated. Upon cooling, the resulting compound does not exhibit gelation and has a melting point which is dependent upon the compounds employed in the preparation of the resinous polyamide reaction product component.

If desirable, a compatible plasticizer can be employed in the preparation of the inventive thermoplastic adhesives. Preferably, compatible plasticizers are added in an amount of between about 10 to about 40 weight percent with about 10 to about 30 weight percent being optimum, based on the total formulation weight. Examples of compatible plasticizers include toluene sulfonamides, dibutyl phthalate, short chain polyfunctional polyols and the like. The use of compatible plasticizers in thermoplastic adhesive formulations is well-known and thus will not be discussed more particularly herein.

Moreover, compatible fillers can be employed if desired in amounts from 0 up to about 40 weight percent based on formulation weight without reducing the adhesive properties or other physical characteristics of the inventive compound. In fact, compatible fillers have been found to increase the adhesion bond when the adhesive compounds are applied to certain substrates by reducing thermal expansion thus reducing strain during curing of the systems. Examples of compatible fillers include fumed silica, calcium carbonate, kaolin clays, alumina or titanium oxide, etc.

The following examples illustrate the invention in more detail, but are not to be construed as limitative. JEFFAMINE ® is the registered trademark for polyoxypropylene di- and triamines sold by Jefferson Chemical Company, Inc., Houston, Tex.

EXAMPLE 1

To a 1-liter 3-necked flask, fitted with a stirrer, thermometer, distilling head and nitrogen flow system, was added 292 grams (2.0 mole) of diethyl oxalate. The ester was heated up to 105° C. under nitrogen. Then, 421.5 grams (1.02 mole) of a polyoxypropylene diamine having an average molecular weight of 400 (JEFFAMINE D-400, Jefferson Chemical Company, Inc., Houston, Texas) was slowly added over a one hour period as ethanol was removed by distillation. When most of the alcohol had been removed, the pot temperature had reached 125° C., and the flask was subjected to high vacuum (0.025 mm.) for one hour. The residue in the flask was a light yellow mobile oil. The saponification number was 154, corresponding to an equivalent weight of 364. Anal.: Percent N calc. = 4.80; Percent N found = 4.81.

The structure of this prepolymer is shown below:

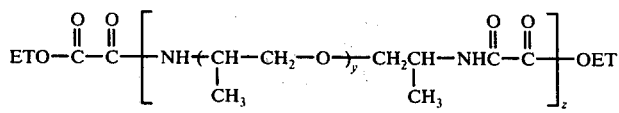

where $y = 5.5$ and $z = 1.25$.

EXAMPLES 2-14

Other prepolymers were prepared in accordance with the procedure outline in Example 1 above. These prepolymers are described in Table I below where the numbers $y$ and $z$ as therein indicated define the structures according to the formula set out in Example 1.

distill over. With the reaction mixture at 210° C. most of the condensate (12.0 g.) had distilled over. High vacuum (0.2 mm) was applied for 30 minutes at 230°-240° C. The thick, yellow polymer was poured into molds where it solidified to a tough, flexible plastic with a Shore A hardness of 94-95. Yield was 102 g. The reduced viscosity (0.5% in 90% formic acid at 25° C.) was

TABLE I

| Example No. | y | z | % N calc. | % N found | Sap. No. (mg KOH/gm) | Eq. Wt. | Color (Gardner) | Viscosity (cps 25° C.) | Physical Descriptions |
|---|---|---|---|---|---|---|---|---|---|
| 2 | 2 | 1.24 | 7.65 | 7.52 | 247 | 227 | 2 | 10,400 | Cloudy, viscous, yellow liquid |
| 3 | 2 | 3.52 | 9.64 | 9.64 | 109.7 | 511 | ~2 | 4,000,000 | Very viscous, lt. yellow liquid |
| 4 | 2.5 | 1.23 | 7.68 | 6.41 | 233 | 241 | — | — | Dark; yellow-red, viscous liquid |
| 5 | 2.5 | 8.44 | 9.30 | 9.36 | 44.1 | 1271 | ~3 | — | Clear, tacky yellow solid |
| 6 | 2.5 | 2.30 | 8.05 | 8.26 | 140 | 400 | 3 | 102,000 | Viscous, yellow oil |
| 7 | 2.5 | 1.12 | 6.77 | 6.73 | 242 | 232 | ~2 | 5,200 | Viscous, yellow oil |
| 8 | 5.5 | 1.02 | 4.65 | 4.66 | 181 | 310 | 1 | — | Lt. yellow, viscous oil |
| 9 | 5.5 | 3.16 | 5.45 | 5.49 | 68.9 | 814 | Nil | — | Water-white, viscous oil |
| 10 | 5.5 | 2.0 | 5.20 | 5.22 | 105 | 536 | <1 | 12,600 | Slightly off-white, viscous oil |
| 11 | 5.5 | 2.5 | 5.34 | 5.37 | 85.7 | 655 | ~1 | 28,000 | Lt. yellow, viscous oil |
| 12 | 5.5 | 2.52 | 5.35 | 5.34 | 85.2 | 659 | <1 | 23,000 | Lt. yellow, viscous oil |
| 13 | 5.5 | 4.75 | 5.64 | 5.72 | 47.5 | 1,180 | ~4 | 158,000 | Very viscous yellow liquid |
| 14 | 5.5 | 1.10 | 4.67 | 4.64 | 170 | 330 | <1 | 1,500 | Lt. yellow, viscous oil |

EXAMPLE 15

Here, the prepolymer of Example 1 was reacted further with a diamine to produce an adhesive compound of the invention. This procedures was as follows.

To a 500 ml. flask fitted as described in Example 1 above, was added 109.2 g. (0.15 mole) of the diester of Example 1. The prepolymer diester was stirred under nitrogen at 70°-75° C. while 17.4 g. (0.15 mole) of hexamethylenediamine was added at once. The reaction was exothermic, and the temperature reached 110° C. as the mixture became a viscous semi-solid. Further heating melted the advanced prepolymer and ethanol began to 0.27. Anal: Percent N calc. = 8.38; Percent N found =8.32.

The structure of this polymer, a typical adhesive composition of the invention, is as follows:

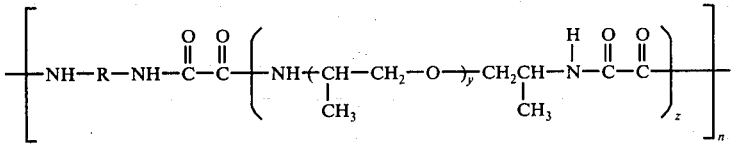

where R = $-CH_2)_6$, $y$ = 5.5 and $z$ = 1.25.

EXAMPLES 16-35

Further adhesive resins of the invention were made according to the procedure outlined in Example 15. Results are given in Table II below. These compounds fall within the structural formula set out in Example 15 with the numbers $y$ and $z$ and the radical R having a significance as below listed.

TABLE II

| Ex. No. | y | z | R | % N calc. | % N found | Total amine meq/g. | Sap.No. meq. KOH/g. | [η] at 25° C. (solvent) | M.p. (° C.) | Physical Properties |
|---|---|---|---|---|---|---|---|---|---|---|
| 16 | 5.5 | 1.02 | $(CH_2)_2$ | 11.63 | 11.58 | 1.84 | — | — | 165-195 | Hard, yellow waxy solid. |
| 17 | 5.5 | 1.02 | $(CH_2)_2NH(CH_2)_2$ | — | — | 3.61 | — | — | — | Viscous, yellow grease. Good epoxy curing agent. MW(osm) 1066. |
| 18 | 5.5 | 3.16 | $(CH_2)_2$ | 7.32 | 7.31 | 0.18 | — | 0.224 (DMF) | 145-155 | Clear, transparent, yellow solid. Not sensitive to water. |
| 19 | 5.5 | 2.0 | $(CH_2)_3$ | 7.92 | 7.91 | 0.15 | — | 0.14 (DMF) | 66-73 | Flexible, strong, clear, non-tacky, yellow solid. |
| 20 | 5.5 | 2.0 | $(CH_2)_2NH(CH_2)_2$ | — | 11.18 | 2.86 | — | — | — | Lt. yellow, viscous liquid MW (osm.) 1160; epoxy curing agent. |
| 21 | 5.5 | 2.0 | $(CH_2)_3-N(CH_3)-(CH_2)_3$ | 11.0 | 10.70 | 2.90 | — | — | — | Lt. yellow, viscous oil, useful as epoxy curing agent. |
| 22 | 2 | 1.24 | $(CH_2)_3-N(CH_3)-(CH_2)_3$ | 15.1 | 14.69 | 2.13 | — | 0.25 (DMF) | — | Hard, yellow brittle plastic; water sensitive; Shore A hardness - 77-78. |
| 23 | 5.5 | 3.16 | $(CH_2)_6$ | 7.09 | 6.96 | 0.093 | 5.71 | 0.30 (DMF) | 57-87 | Opaque, white plastic, Shore A hardness - 63-64. |
| 24 | 2 | 3.52 | $(CH_2)_2$ | 11.43 | 12.66 | 0.13 | — | 0.28 (90% HCOOH) | 190-206 | Opaque, hard lt. yellow plastic Shore A hardness - 94-95. |
| 25 | 5.5 | 2.5 | $(CH_2)_2$ | 7.67 | 7.58 | 0.13 | 14.1 | 0.20 | 161- | Tough, flexible, clear yellow |

TABLE II-continued

| Ex. No. | y | z | R | % N calc. | % N found | Total amine meq/g. | Sap.No. meq. KOH/g. | $[\eta]$ at 25° C. (solvent) | M.p. (° C.) | Physical Properties |
|---|---|---|---|---|---|---|---|---|---|---|
| 26 | 5.5 | 2.5 | 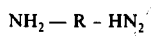 | 7.07 | 6.97 | — | 7.27 | (90% HCOOH) — | 162 — | plastic. Shore A hardness 90-91. Not water sensitive. Water-white, tacky, rubbery plastic. |
| 27 | 2.5 | 8.44 | $(CH_2)_2$ | 10.50 | 10.64 | — | 13.8 | 0.16 (90% HCOOH) | — | Hard, brittle, clear yellow plastic. |
| 28 | 2.5 | 8.44 | $(CH_2)_2-NH-(CH_2)_2$ | 11.45 | 11.63 | 1.27 | — | — | — | Slightly tacky, clear yellow plastic MW (osm) 2530. Good epoxy curing agent. |
| 29 | 2.5 | 2.3 | $(CH_2)_6$ | 11.50 | 11.20 | 0.23 | — | 0.28 (90% HCOOH) | 122-125 | Lt. yellow, brittle plastic; Shore A hardness of 94-95. |
| 30 | 5.5 | 2.5 | $(CH_2)_6$ | 7.34 | 7.34 | 0.14 | 1.0 | 0.24 (90% HCOOH) | — | Flexible, elastomeric solid with cloudy, off-white appearance. Shore A hardness 60-61. |
| 31 | 5.5 | 1.25 | $(CH_2)_6$ | 8.37 | 8.32 | 0.08 | — | 0.27 (90% HCOOH) | — | Lt. yellow, opaque, tough, flexible plastic with Shore A hardness 94-95. |
| 32 | 5.5 | 1.25 |  | 7.40 | 7.35 | 0.123 | — | 0.177 (90% (HCOOH) | 177-180 | Lt. yellow, hard, tough, clear plastic. |
| 33 | 5.5 | 2.5 | 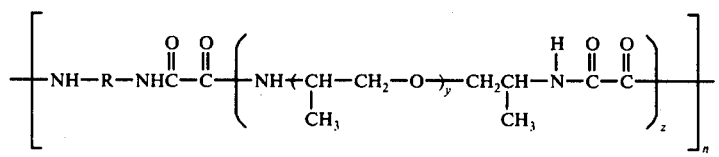 | 6.86 | 6.82 | 0.157 | — | 0.158 (90% HCOOH) | — | Lt. yellow, flexible elastomer. |
| 34 | 5.5 | 1.25 | $(CH_2)_2-NH-(CH_2)_2$ | 12.75 | 12.07 | 2.99 | — | — | — | A tacky, lt. yellow solid used as epoxy curing agent. |
| 35 | 5.5 | 1.1 | $(CH_2)_3$ | 9.18 | 9.07 | 0.116 | — | 0.24 (90% HCOOH) | — | Hard, clear, yellow plastic. |

Obviously, many modifications and variations of the invention as hereinbefore set forth may be made without departing from the spirit and scope thereof and, therefore, only such limitations should be imposed as are indicated in the claims

I claim:

1. A resinous polyoxamide thermoplastic adhesive formed by reacting one mole of a polyoxypropylene polyamine selected from the group consisting of diamines, triamines and mixtures thereof, and having an average molecular weight of about 190 to about 3,000 with 1-4 moles of oxalic acid or a lower alkyl mono or diester of oxalic acid to form a liquid prepolymer, 1 mole of said prepolymer being further reacted with 0.5-1.5 mole of a diamine having the formula:

$$NH_2 - R - HN_2$$

where R is a divalent hydrocarbon radical containing 2-18 carbon atoms to form said resinous polyoxamide.

2. The resinous polyoxamide of claim 1 which has a melting point less than about 250° C.

3. The resinous polyoxamide of claim 2 which has a melting point of 80°-250° C.

4. A thermoplastic adhesive resinous polyoxamide characterized by the following repeating units:

$$\left[-NH-R-NH\overset{O}{\underset{\|}{C}}-\overset{O}{\underset{\|}{C}}-\left(NH-\underset{\underset{CH_3}{|}}{CH}-CH_2-O\right)_y CH_2\underset{\underset{CH_3}{|}}{CH}-\overset{H}{\underset{|}{N}}-\overset{O}{\underset{\|}{C}}-\overset{O}{\underset{\|}{C}}\right)_z\right]_n$$

where R is a divalent hydrocarbon radical containing 2-18 carbon atoms, y is a number ranging from about 2 to about 40, z is a number ranging from about 1 to 10 and n is a number ranging from about 2 to 20.

5. The resinous polyoxamide of claim 4 which is further characterized as having a melting point less than about 250° C.

6. The resinous polyoxamide of claim 5 which has a melting point of 80°-250° C.

7. The resinous polyoxamide of claim 4 wherein y is a number ranging from about 2 to about 20.

8. The resinous polyoxamide of claim 4 wherein R is hexamethylene.

9. The resinous polyoxamide of claim 4 wherein R is ethylene.

10. A process of preparing a resinous polyoxamide thermoplastic adhesive composition which comprises the steps of reacting 1 mole of a polyoxypropylene polyamine selected from the group consisting of diamines, triamines and mixtures thereof and having an average molecular weight of about 190 to about 3,000 with 1-4 moles of oxalic acid or an ester of oxalic acid at 75°-150° C. to form a prepolymer, and reacting 1 mole of said prepolymer with 0.5-1.5 moles of a diamine having the formula:

$$NH_2 - R - NH_2$$

where R is a divalent hydrocarbon radical containing 2-18 carbon atoms at a temperature ranging from about 100° C. to about 250° C.

11. The process of claim 10 wherein said thermoplastic adhesive composition has a melting point less than 250° C.

12. The process of claim 11 wherein said composition has a melting point of 80°–250° C.

13. The process of claim 10 wherein 1–2 moles of oxalic acid are reacted with 1 mole of polyoxypropylene polyamine, and 0.5–1 moles of diamine are reacted with 1 mole of prepolymer.

14. A process of preparing a resinous polyoxamide thermoplastic adhesive composition characterized by the following repeating units:

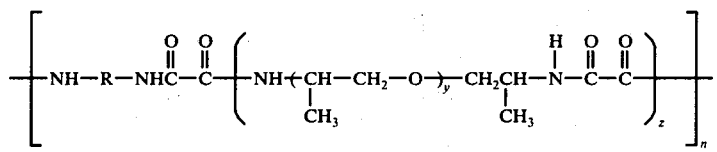

where R is a divalent hydrocarbon radical containing 2–18 carbon atoms, $y$ is a number ranging from about 2 to about 40, $z$ is a number ranging from about 1 to 10 and $n$ is a number ranging from about 2 to 20, which comprises the steps of reacting 1–4 moles of oxalic acid or an ester of oxalic acid at 75°–150° C. with 1 mole of a polyoxypropylene diamine having the following structural formula:

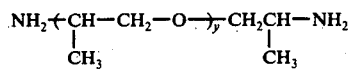

where $y$ has a significance as expressed above, to form a liquid prepolymer, reacting said prepolymer with a diamine having the formula

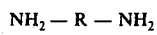

where R is a divalent hydrocarbon radical radial containing 2–18 carbon atoms in a mole ratio of 0.5–1.5 moles of diamine per mole of prepolymer at a temperature of 100°–250° C. to provide said thermoplastic adhesive compound.

15. The process of claim 14 wherein said thermoplastic adhesive composition has a melting point less than 250° C.

16. The process of claim 14 wherein said thermoplastic adhesive composition has a melting point of 80°–250° C.

17. The process of claim 14 wherein 1–2 moles of oxalic acid or ester of oxalic acid are reacted per mole of polyoxypropylene diamine and 0.5–1 mole of diamine is reacted per mole of prepolymer.

18. The process of claim 14 wherein R is hexamethylene.

19. The process of claim 14 where R is ethylene.

* * * * *